(12) United States Patent
Yang

(10) Patent No.: US 7,516,462 B2
(45) Date of Patent: Apr. 7, 2009

(54) TRANSMISSION MECHANISM FOR DISK DRIVING SYSTEM

(76) Inventor: Dongzuo Yang, Shixi Industry Building, 6th Road, Liwu, Wusha, Chang'an Town, Dongguan City, Guangdong (CN) 523860

( * ) Notice: Subject to any disclaimer, the term of this patent is extended or adjusted under 35 U.S.C. 154(b) by 673 days.

(21) Appl. No.: 11/206,038

(22) Filed: Aug. 18, 2005

(65) Prior Publication Data

US 2005/0289568 A1 Dec. 29, 2005

(51) Int. Cl.
*G11B 17/04* (2006.01)

(52) U.S. Cl. ...................................... 720/619

(58) Field of Classification Search ................. 720/619, 720/607, 608, 690, 616, 714, 601, 700, 651, 720/713, 604, 615, 626, 621
See application file for complete search history.

(56) References Cited

U.S. PATENT DOCUMENTS

| 5,959,956 A * | 9/1999 | Takishima ................... 720/607 |
| 6,011,766 A * | 1/2000 | Nguyen et al. .............. 720/607 |
| 7,228,552 B2 * | 6/2007 | Morikawa ..................... 720/619 |
| 2003/0095490 A1* | 5/2003 | Kobiyama ................... 369/77.1 |
| 2005/0015788 A1* | 1/2005 | Morikawa ..................... 720/619 |

* cited by examiner

*Primary Examiner*—Allen T Cao
(74) *Attorney, Agent, or Firm*—IPFortune LLC; Ruay Lian Ho

(57) ABSTRACT

The present invention provides a transmission mechanism for disk player driving systems, mainly improves the disadvantages of the currently available technology, such as complicated structure and high production cost. The present invention includes a slot for inserting recording media, the slot is flanked by a chassis, a plurality of wall troughs with downward curves at the back end are formed on each side of the chassis, a transfer base installed inside the slot with a plurality of guide bars extend and intersect the chassis, the guide bars guide the inserted recording medium onto the required position for reading.

20 Claims, 4 Drawing Sheets

TRANSMISSION MECHANISM FOR DISK DRIVING SYSTEM

FIELD OF THE INVENTION

The present invention relates to disk driving systems using Compact Disc, Digital Video Disc and the like as information recording media for recording information (recording and/or playing), particularly, the present invention relates to the transmission mechanism used for the CD loading or unloading in CD driving systems.

BACKGROUND OF THE INVENTION

Because CD has the characters of high density, and completely digital recording, it has become the main digital data recording medium, and has been widely applied in optical disk players, such as CD, CD-ROM, VCD, DVD, LD and MD, more and more involved in people's daily life. In the existing compact disc players, there are mainly two types of transmission mechanisms used in CD driving systems that load and unload CDs, the first type is loading CDs into or unloading CDs from the disk players through a disk tray, a driven rack is employed underneath the disk tray, when the contact switch is turned on, a motor drives a driving gear to rotate, the driving gear then drives the disk tray in and out of the disk player by driving the driven rack operation, the structure of this type of transmission mechanism for the disk driving system is more simple in terms of its structure, but because the disk tray is required, and after loading the disk into the disk player, a gap needs to be preserved between the CD and the disk tray to ensure the CD driven by the motor is turning smoothly, the thickness of the disk driving system is then substantial, which is not satisfactory to consumers' demand of super thin and appealing appearances; particularly, because the CD tray can only go straight in and out of the disk player, in order to raise the CD to keep a certain gap between the CD and the disk tray, it is necessary to design the connections between those members like a spindle motor that drives the CD to rotate, a laser head, a collimating lens etc. of the optical pickup mechanism and other fixtures to be flexible; hence, it is difficult to make sure those members like a laser head, a collimating lens etc., are placed into an accurate corresponding position of the inserted CD and therefore very difficult to avoid vibration, which directly affects the correctness of data reading, especially after a long term usage, this problem becomes even more obvious when some members are worn out; another type of transmission mechanism used in disk player driving system is the receiving, ejection type, mainly used in vehicle disk players, including position switches, when users insert a CD into the slot, the CD triggers the position switch inside the disk player, and activates the motor, the driving gear starts to rotate, through the transmission of the driven rack, the friction created by the contact between the driving gear and the CD brings the CD into the disk player, and places the CD in the position corresponding to the position of the spindle motor, the driving gear is then moving downward under the operation of the motor, and a gap is created between the CD and the driving gear, after been clamped by the clamping means, the CD driven by the spindle motor starts to rotate, and the related members start reading data, etc., the structure of this type of transmission mechanism of disk driving systems, the CD optical pickup mechanism can be fixed, a normal data reading can be guaranteed, and the thickness is much smaller; however, the transmission mechanism is complicated, requiring higher manufacturing accuracy, higher cost.

SUMMARY

The object of the present invention is to provide a type of transmission mechanism for disk player driving systems, which does not require a disk tray, simple structure, higher reading quality can then be guaranteed plus avoiding vibration effectively, less thickness, and lower cost; the further object of the present invention is that in the process of transmitting a CD, the CD can be tightly clamped, and will definitely be placed into the required position.

The described transmission mechanism of the disk driving system of the present invention includes a slot for inserting CDs, the slot is flanked by a chassis, wherein wall troughs are created, there is a transfer base inside the slot, an opening is created on the transfer base corresponding to an optical pickup mechanism, the transfer base and the chassis are connected with a driving gear driven by a motor, a driven rack that matches the driving gear is formed on an appropriate position of the transfer base, a limiting device is installed on the transfer base to prevent the separation of the transfer base and the driving gear; a plurality of guide bars intersecting the chassis are installed in the transfer base, the plurality of guide bars extend into the corresponding wall troughs, in the back end of the described wall troughs, the wall trough curves downward, when the guide bar moves toward the downward curve of the wall trough, a rabbet that matches the shape of the driving gear is formed at the corresponding position where the driven rack gets in contact with the driving gear;

A garter spring is installed on the above described transfer base, the back end of the garter spring is connected to the transfer base permanently, the front end is free; a rubber tier is installed on a portion of the front end that contacts CDs.

The above described transmission mechanism of the disk driving system of the present invention, disk unloading and loading are done by the inner transfer base, no disk tray is necessary; the transfer base moves along a wall trough transferring CDs directly to the CD turntable position of the spindle motor or to a position around the CD turntable, the transfer base then moves downward when it reaches the downward curve at the end of the wall trough, and a gap is kept between the transfer base and the inserted CD, simple structure, and the optical pickup mechanism can be at a fixed position, the quality of data reading is guaranteed and vibration can be avoided effectively; due to the installation of a garter spring on the transfer base, after inserting a CD by the users, the garter spring clamps the CD and the transfer base together, the CD is therefore clamped tight, transferring the CD to the required position can then be guaranteed.

DESCRIPTION OF THE DRAWINGS

The present invention can be further described in details by combining the following attached drawings with the preferred embodiments.

DETAILED DESCRIPTION OF THE INVENTION

Figure 1:
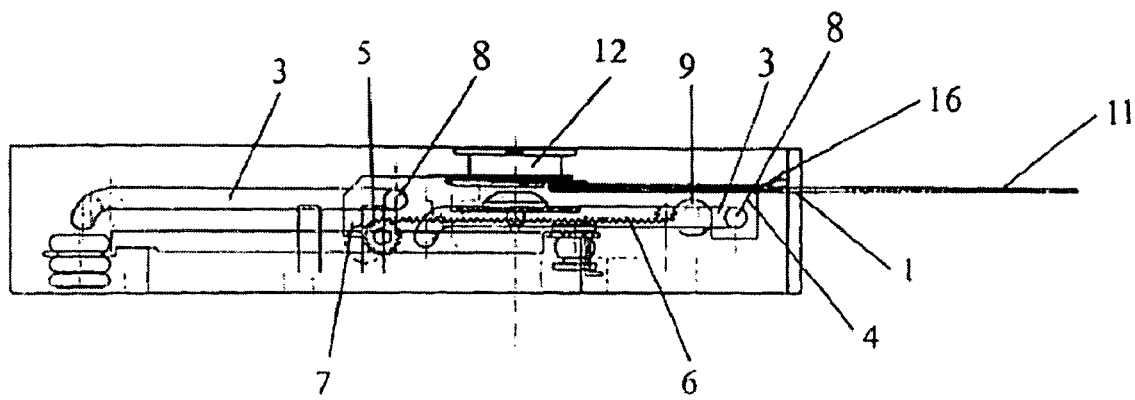
FIG. 1 is a side view of the structure of the present invention.
Figure 2:
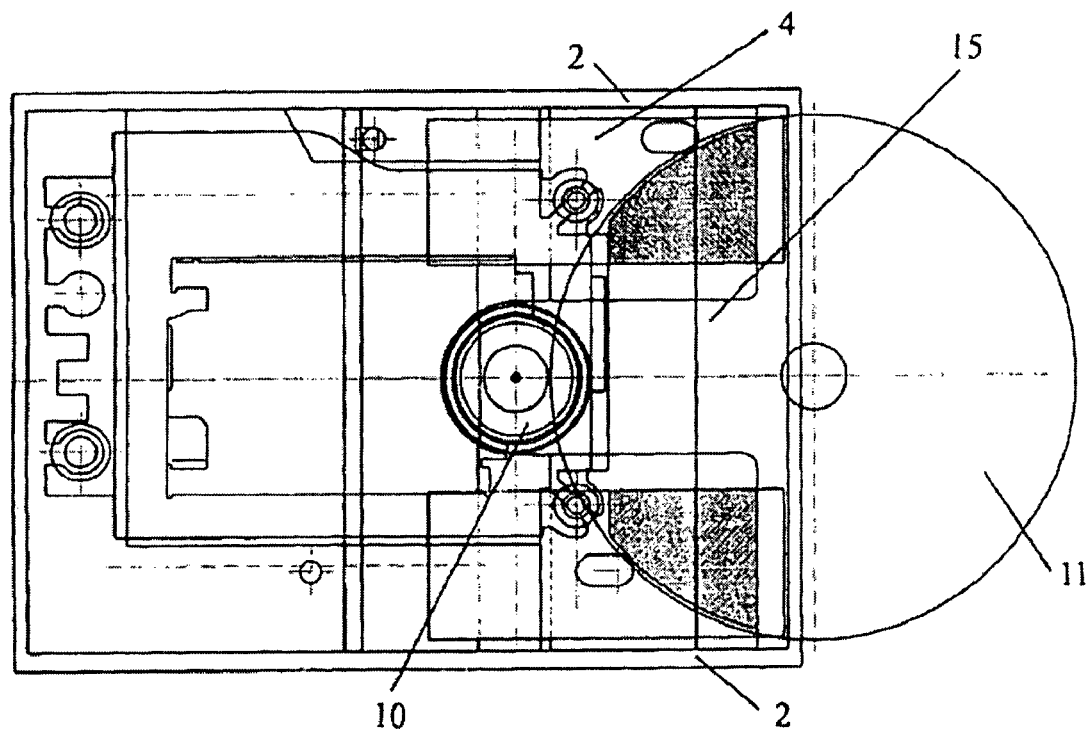
FIG. 2 is a top view of the structure of the present invention.

The described transmission mechanism of the disk driving system of the present invention includes a slot 1 for inserting CD, the slot 1 is flanked by a chassis 2, wall troughs 3 are created on the chassis 2, there is a transfer base 4 inside the slot 1, an opening 15 is created on the transfer base 4 corresponding to an optical pickup mechanism, the transfer base 4 and the chassis 2 are connected with a driving gear 5 driven by a motor, a driven rack 6 that matches the driving gear 5 is formed on an appropriate position of the transfer base 4, a limiting device is installed on the transfer base 4 to prevent the separation of the transfer base 4 and the driving gear 5, such as a protrusion 7 extends towards the direction of the driving gear 5, a plurality of guide bar 8 intersecting the chassis 2 are installed in the transfer base 4, the plurality of guide bars 8 extend into the corresponding wall troughs 3, in the back end of the described wall troughs 3, the wall trough 3 curves downward, when the guide bar 8 moves toward the downward curve of the wall trough 3, a rabbet 9 that matches the shape of the driving gear 5 is formed at the corresponding position where the driven rack 6 gets in contact with the driving gear 5; as shown in FIGS. 1, 2, 3, 4, the described wall trough 3 extends along the same direction as the insertion of a CD, and two or more than two wall troughs 3 are formed on each side of the chassis 2, accordingly two or more than two of the described guide bars 8 intersect the corresponding wall troughs 3 respectively, this operation guarantees the proper transition of the transfer base 4 during the transmission process, at the end of the wall trough 3, the starting point of the downward curve corresponding to the transfer base 4 guides a CD onto the position of the turntable 10 of the spindle motor or onto the position of the guide bar 8 that is located at the range of the turntable 10 position;

After inserting a CD 11, the CD triggers the position switch inside the optical disk player, and starts the motor driving the driving gear 5 to rotate, the driving gear 5 drives the transfer base 4 moving along the wall trough 3 towards the spindle motor, and placing the CD 11 onto the turntable 10 of the spindle motor or onto the range of the turntable 10, meanwhile the guide bar of the transfer base 4 is located at the downward curve area of the wall trough 3, and moving downward inside the track of the wall trough 3, after reaching the final position, the CD 11 triggers the position switch installed at that position, and shuts down the motor that drives the driving gear 5, at the same time separates the transfer base 4 and the CD 11, the CD 11 then falls into the turntable 10 of the spindle motor, a magnetic head 12 descends, the spindle motor drives the CD 11 to rotate and reads the CD; when users push the ejection button, the transmission mechanism of the disk driving system operates reversely according to the above described processes, outputting the CD 11, when the transfer base 4 moves to the front end position of the limiting device, it triggers the position switch, and shuts down the motor that drives the driving gear 5.

Figure 3:
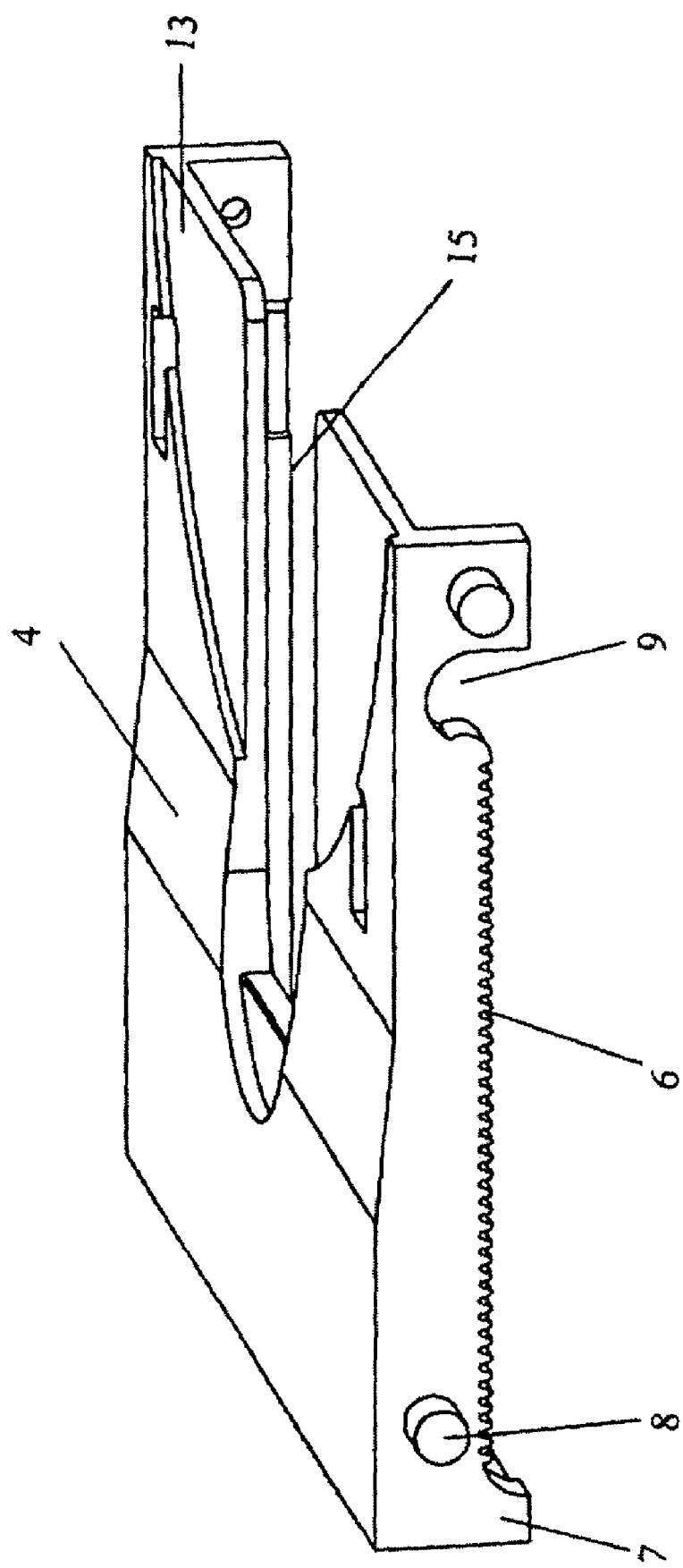
FIG. 3 is a structural schematic diagram of the present invention.
Figure 4:
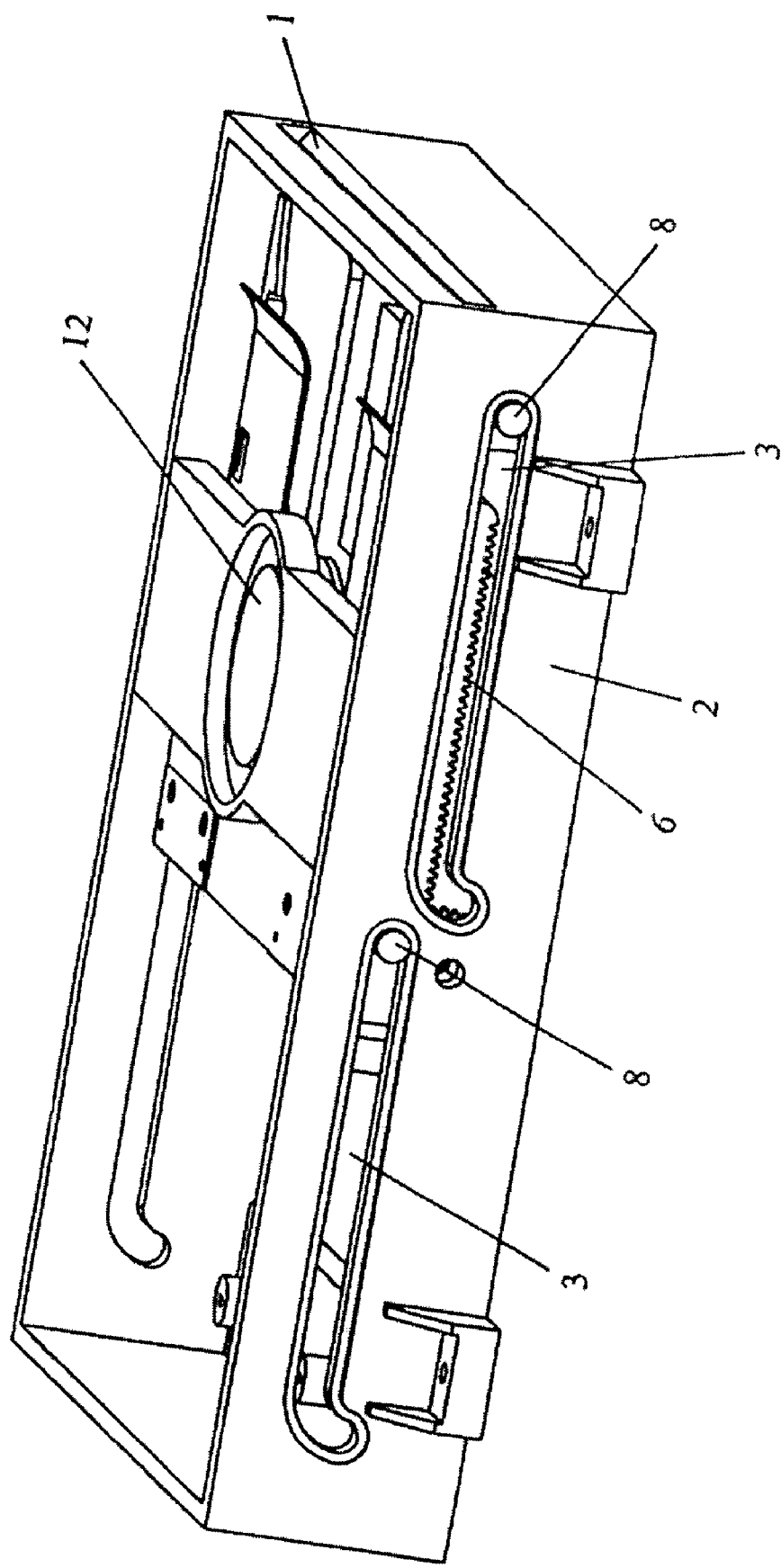
FIG. 4 is another structural schematic diagram of the present invention.
Figure 5:
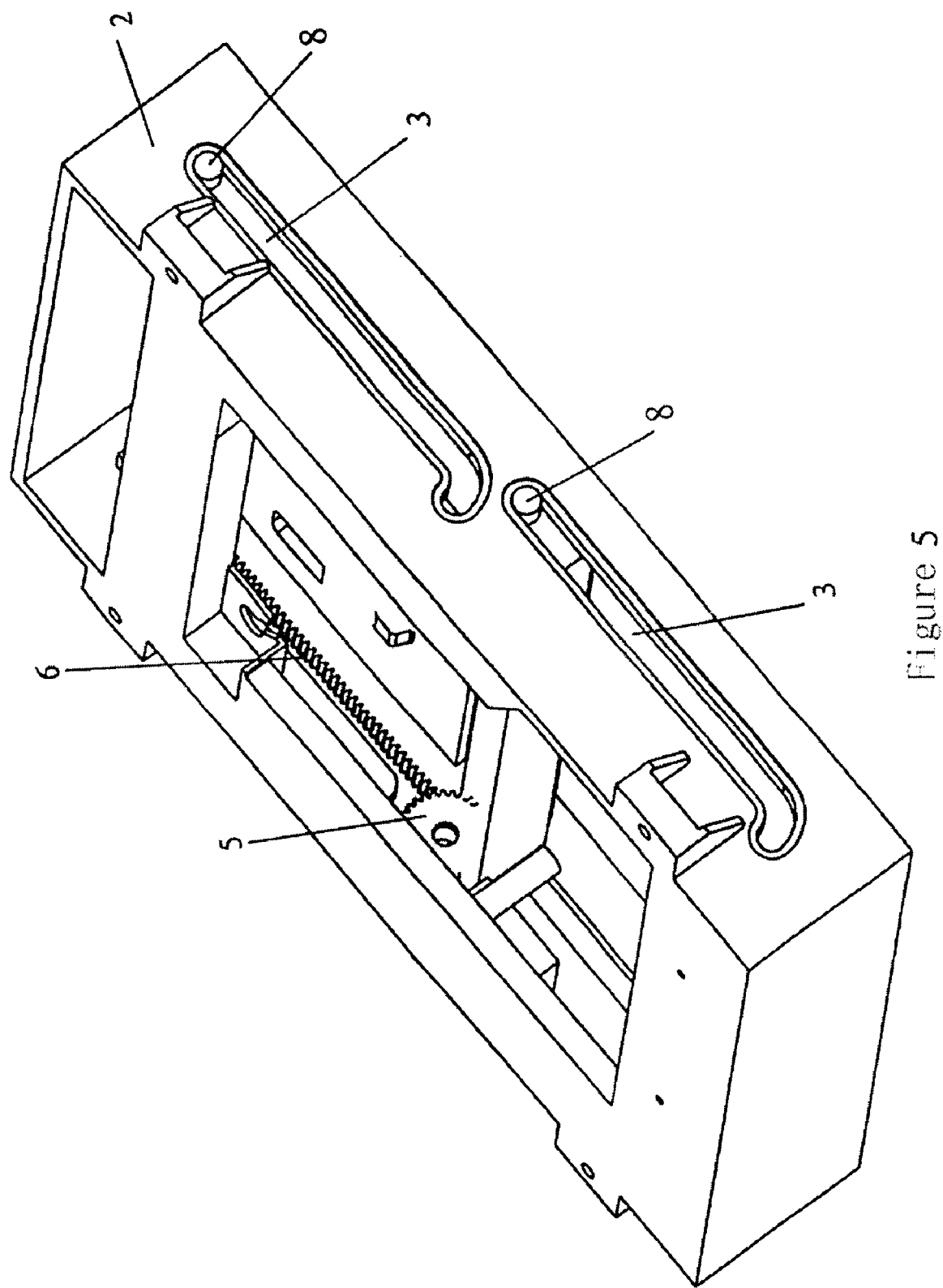
FIG. 5 is the structural schematic diagram showing the bottom side of view of the present invention.

As shown in FIG. 1, a garter spring 16 is installed on the transfer base, the back end of the garter spring 16 is connected to the transfer base 4 permanently, the front end is free, a rubber tier is installed at the front end that contacts CDs to prevent abrasion;

As shown in FIG. 3, a concave groove 13 is formed on the transfer base 4 corresponding to the shape of a CD.

What I claimed is:

1. A transmission mechanism of a disk driving system comprises:
    a slot for receiving recording media;
    a transfer base installed inside the slot, wherein a concave groove is formed on the transfer base corresponding to the shape of a medium;
    a plurality of wall troughs formed on each side of a chassis that flanks the slot; and
    a plurality of guide bars formed in the transfer base.

2. The transmission mechanism of a disk driving system as claimed in claim 1, wherein the transfer base further comprises an opening for an optical pickup mechanism.

3. The transmission mechanism of a disk driving system as claimed in claim 2, wherein the transfer base is connected to the chassis by a driving gear driven by a motor.

4. The transmission mechanism of a disk driving system as claimed in claim 3, wherein the transfer base further comprises a driven rack matching the driving gear at an appropriate position.

5. The transmission mechanism of a disk driving system as claimed in claim 4, wherein the transfer base further comprises a limiting device preventing the separation of the transfer base and the driving gear.

6. The transmission mechanism of a disk driving system as claimed in claim 5, wherein the limiting device includes a protrusion extends towards the direction of the driving gear.

7. The transmission mechanism of a disk driving system as claimed in claim 1 further comprises a plurality of downward curves formed at the back end of the plurality of wall troughs.

8. The transmission mechanism of a disk driving system as claimed in claim 1, wherein the plurality of guide bars extend into and intersect the corresponding plurality of wall troughs.

9. The transmission mechanism of a disk driving system as claimed in claim 1, wherein a rabbet that matches the shape of the driving gear is formed at the corresponding position where the driven rack gets in contact with the driving gear.

10. The transmission mechanism of a disk driving system as claimed in claim 9, wherein the downward curve, during the transmission process, of a corresponding wall trough guides a recording medium onto the position of a turntable or onto the range of a turntable.

11. The transmission mechanism of a disk driving system as claimed in claim 1, wherein a garter spring is connected to the transfer base.

12. The transmission mechanism of a disk driving system as claimed in claim 11, wherein a rubber tier is installed at the front end of the garter spring that contacts recording media to prevent abrasion.

13. The transmission mechanism of a disk driving system as claimed in claim 1, wherein a concave groove is formed on the transfer base corresponding to the shape of a CD.

14. A process of making a transmission mechanism of a disk driving system comprises:
    installing a transfer base inside a slot, wherein a concave groove is formed on the transfer base corresponding to the shape of a medium;
    creating a plurality of wall troughs on each side of a chassis that flanks the slot; and
    forming a plurality of guide bars in the transfer base.

15. The process of making a transmission mechanism of a disk driving system as claimed in claim 14, wherein the transfer base is connected to the chassis by a driving gear driven by a motor.

16. The process of making a transmission mechanism of a disk driving system as claimed in claim 15, wherein the transfer base further comprises a limiting device preventing the separation of the transfer base and the driving gear.

17. The process of making a transmission mechanism of a disk driving system as claimed in claim 16, wherein the limiting device includes a protrusion extends towards the direction of the driving gear.

18. The process of making a transmission mechanism of a disk driving system as claimed in claim 14, wherein a plurality of downward curves formed at the back end of the plurality of wall troughs.

19. The process of making a transmission mechanism of a disk driving system as claimed in claim 14, wherein the plurality of guide bars extend into and intersect the corresponding plurality of wall troughs.

20. A method of making a transmission mechanism of a disk driving system comprises:

installing a transfer base inside a slot, wherein a concave groove is formed on the transfer base corresponding to the shape of a medium;

creating a plurality of wall troughs on each side of a chassis that flanks the slot;

providing a plurality of guide bars in the transfer base; and forming a plurality of downward curves at the back end of the plurality of wall troughs.

* * * * *